(12) United States Patent
Katsura

(10) Patent No.: US 8,398,162 B2
(45) Date of Patent: Mar. 19, 2013

(54) ROOF APPARATUS FOR VEHICLE

(75) Inventor: Shintaro Katsura, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/137,179

(22) Filed: Jul. 26, 2011

(65) Prior Publication Data

US 2012/0126585 A1     May 24, 2012

(30) Foreign Application Priority Data

Nov. 22, 2010   (JP) ................................. 2010-260178

(51) Int. Cl.
*B60J 7/047*     (2006.01)
*B60J 7/19*     (2006.01)

(52) U.S. Cl. ..................... 296/216.03; 296/223; 296/224

(58) Field of Classification Search ...... 296/216.01–224
See application file for complete search history.

(56) References Cited

U.S. PATENT DOCUMENTS

| | | | | |
|---|---|---|---|---|
| 5,580,123 A | * | 12/1996 | Ochiai ........................... | 296/223 |
| 6,290,289 B1 | | 9/2001 | Ohtsu et al. | |
| 6,394,540 B1 | * | 5/2002 | Manders ....................... | 296/223 |
| 6,890,025 B2 | * | 5/2005 | Hanke ........................... | 296/223 |
| 7,644,980 B2 | * | 1/2010 | Hager et al. ................... | 296/223 |
| 2009/0072588 A1 | | 3/2009 | Nakamura | |

FOREIGN PATENT DOCUMENTS

| | | |
|---|---|---|
| DE | 100 24 829 | 5/2001 |
| JP | 7-81426 | 3/1995 |
| JP | 7-205661 | 8/1995 |

OTHER PUBLICATIONS

Extended European Search Report for Ep Appl. No. 11182022.1 dated Jan. 30, 2012.
U.S. Appl. No. 13/200,351, filed Sep. 23, 2011.

\* cited by examiner

*Primary Examiner* — Dennis Pedder
(74) *Attorney, Agent, or Firm* — Finnegan, Henderson, Farabow, Garrett & Dunner, LLP

(57) ABSTRACT

A roof apparatus for a vehicle, which includes a driving shoe provided along a guide rail, a support member, a pair of first wall portions, a second wall portion provided being arranged between the first wall portions, the second wall portion including a movable member, the movable panel being tilted-up from a closed state by pushing one of guide grooves provided at the driving shoe and the movable member by the other one of the guide grooves and the movable member to move the support member upwardly relative to the driving shoe in response to a movement of the driving shoe in the front-rear direction of the vehicle, and a pair of restriction portions provided at the first wall portions and contacting end surfaces of the movable member in the vehicle width direction during the tilted-up state of the movable panel with pressure.

9 Claims, 6 Drawing Sheets

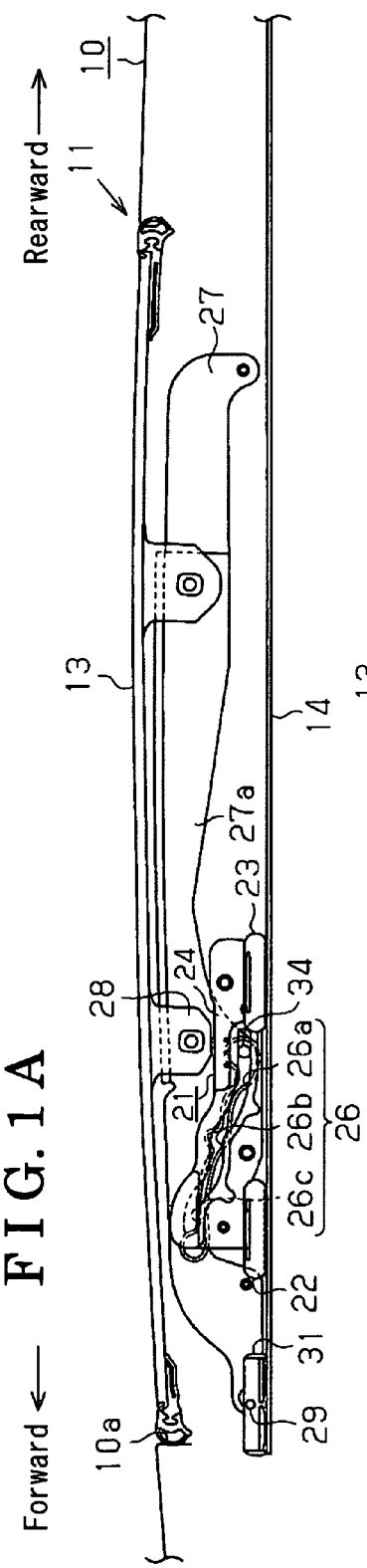
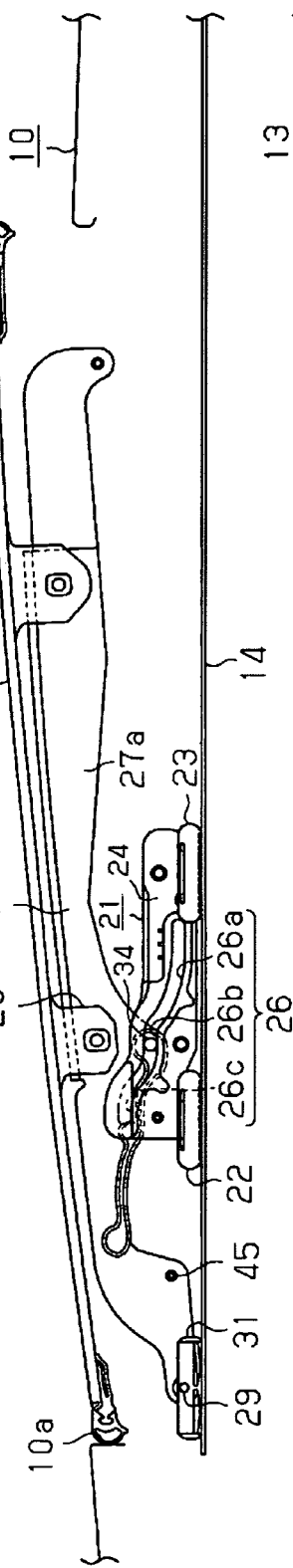
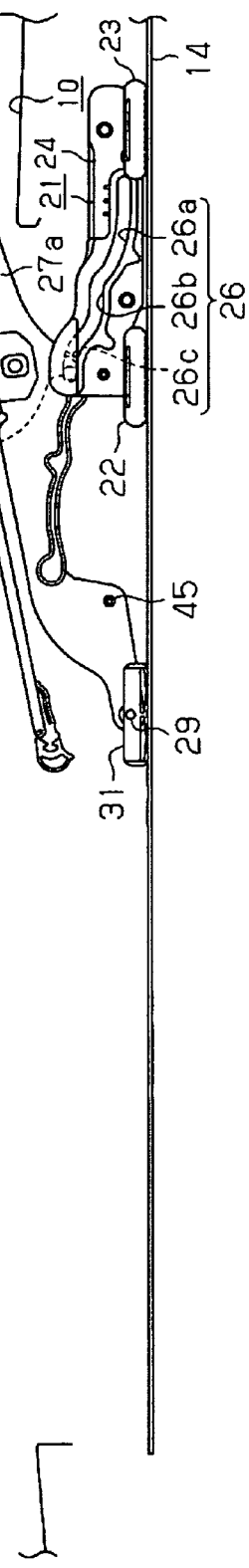
FIG.1A
FIG.1B
FIG.1C

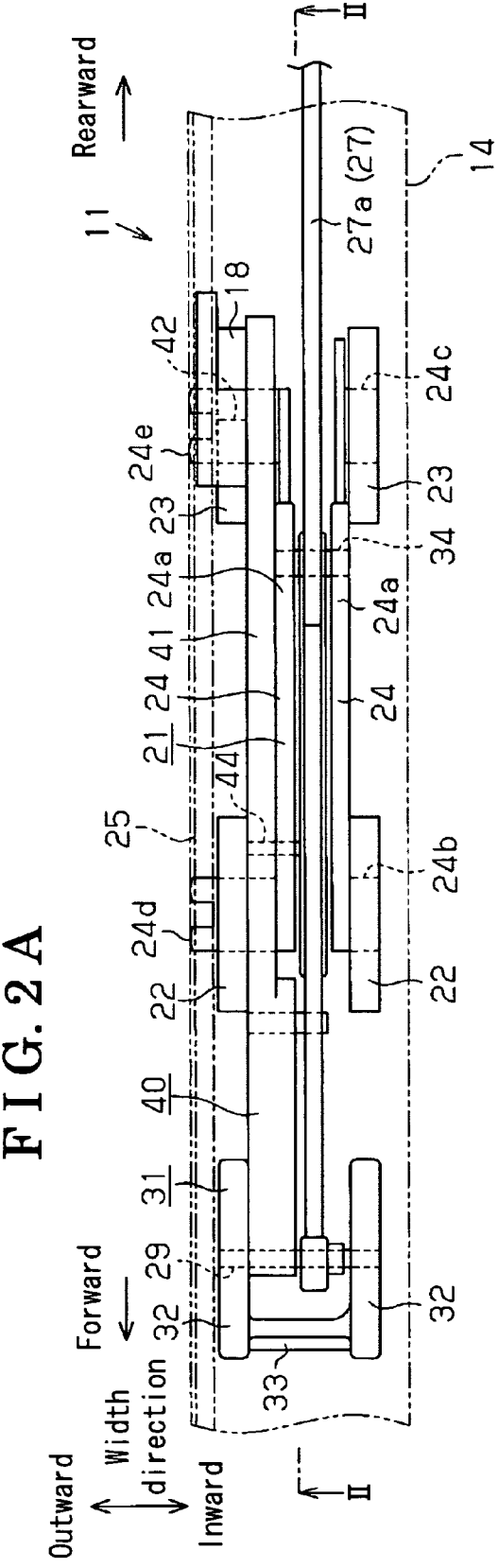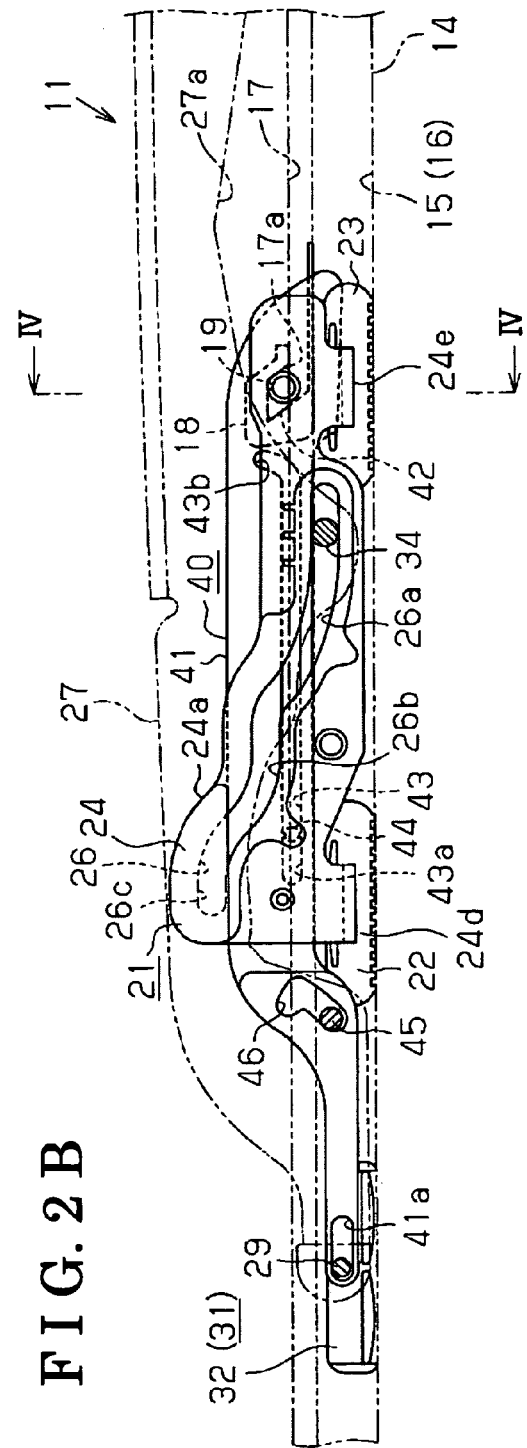

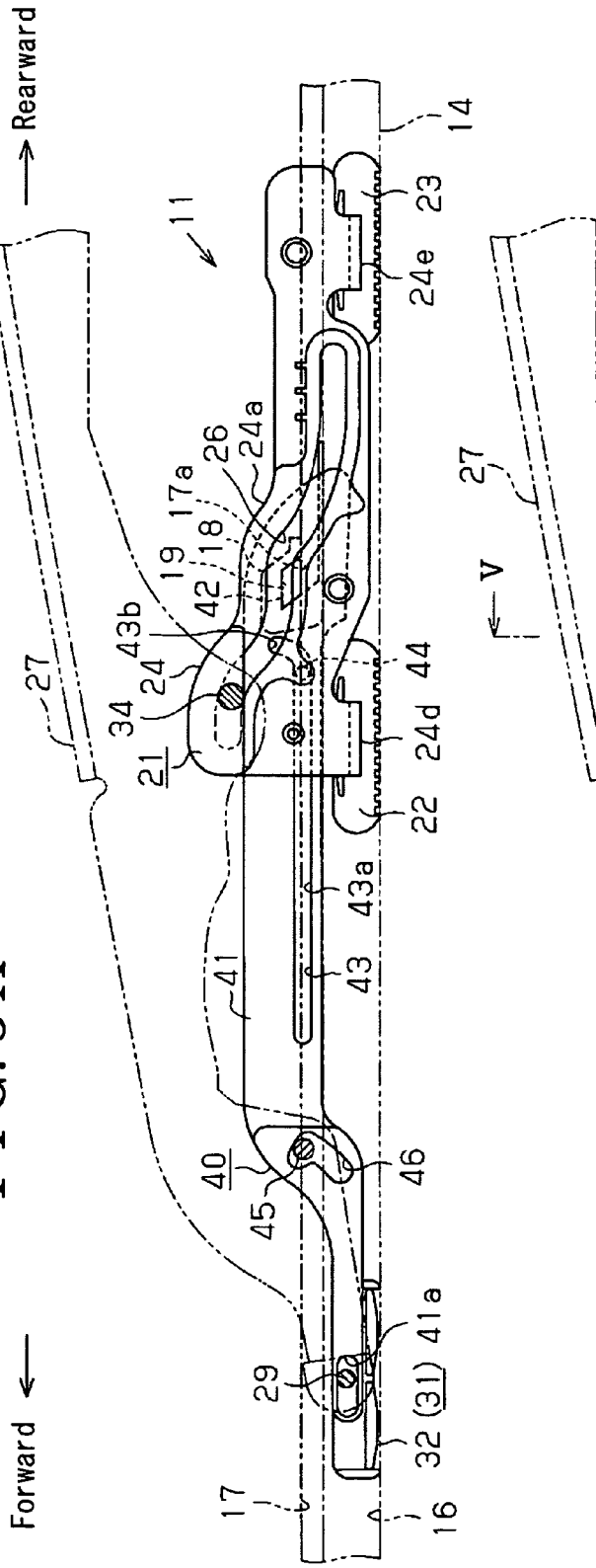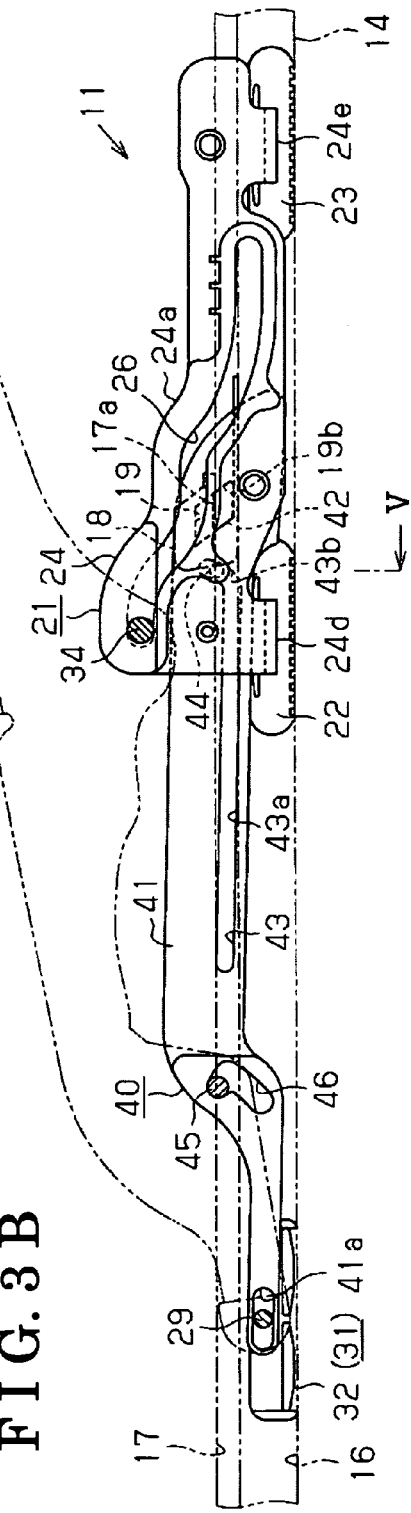
FIG. 3A
FIG. 3B

ROOF APPARATUS FOR VEHICLE

CROSS REFERENCE TO RELATED APPLICATIONS

This application is based on and claims priority under 35 U.S.C. §119 to Japanese Patent Application 2010-260178, filed on Nov. 22, 2010, the entire content of which is incorporated herein by reference.

TECHNICAL FIELD

This disclosure generally relates to a roof apparatus for a vehicle.

BACKGROUND DISCUSSION

A known roof apparatus for a vehicle is disclosed in JPH07-81426A (hereinafter, referred to as Patent reference 1). According to the known roof apparatus, when sliding a driving body in a rearward direction along a guide rail via a cable by an actuation of a driving mechanism from a state where a slide panel is fully closed, the slide panel pivots about a shaft together with a support bracket to slide in a downward direction. During the sliding down operation of the slide panel, a side surface of an elastic member comes to contact the support bracket in a vehicle width direction. Accordingly, the movement of the slide panel is restricted in the vehicle width direction.

According to the construction of Patent reference 1, because the elastic member for restricting the movement of the slide panel in the vehicle width direction is additionally required, the number of parts is increased. Further, because a material (i.e., rubber) whose hardness is changeable depending on the temperature is applied as the elastic member, a performance when restricting the movement of the slide panel in the vehicle width direction is varied.

A need thus exists for a roof apparatus for a vehicle which is not susceptible to the drawback mentioned above.

SUMMARY

In light of the foregoing, the disclosure provides a roof apparatus for a vehicle, which includes a driving shoe provided along a guide rail which is provided at an edge portion of an opening portion formed on a roof of the vehicle in a vehicle width direction, the driving shoe being movable in a front-rear direction of the vehicle, a support member fixed at an edge portion in the vehicle width direction of a movable panel opening and closing the opening portion of the roof, a pair of first wall portions provided at one of the driving shoe and the support member, each of the first wall portions being formed with a guide groove and the first wall portions being arranged in parallel to each other in the vehicle width direction, a second wall portion provided at the other of the driving shoe and the support member, and being arranged between the first wall portions, the second wall portion including a movable member, the movable panel being tilted-up from a closed state by pushing one of the guide grooves provided at the driving shoe and the movable member by the other one of the guide grooves and the movable member to move the support member upwardly relative to the driving shoe in response to a movement of the driving shoe in the front-rear direction of the vehicle, and a pair of restriction portions provided at the first wall portions and contacting end surfaces of the movable member in the vehicle width direction during the tilted-up state of the movable panel with pressure.

BRIEF DESCRIPTION OF THE DRAWINGS

The foregoing and additional features and characteristics of this disclosure will become more apparent from the following detailed description considered with the reference to the accompanying drawings, wherein:

FIG. 1A is a lateral view of a roof apparatus showing a fully closed state of a movable panel according to an embodiment disclosed here;

FIG. 1B is a lateral view of the roof apparatus during a tilt-up operation of the movable panel according to the embodiment disclosed here;

FIG. 1C is a lateral view of the roof apparatus showing a fully open state of the movable panel according to the embodiment disclosed here;

FIG. 2A is a plan view of the roof apparatus according to the embodiment disclosed here;

FIG. 2B is a cross-sectional view taken on line II-II in FIG. 2A of the roof apparatus according to the embodiment disclosed here;

FIG. 3A is a cross-sectional view showing an operation of the roof apparatus according to the embodiment disclosed here;

FIG. 3B is a cross-sectional view showing an operation of the roof apparatus according to the embodiment disclosed here;

DETAILED DESCRIPTION

Figure 7:
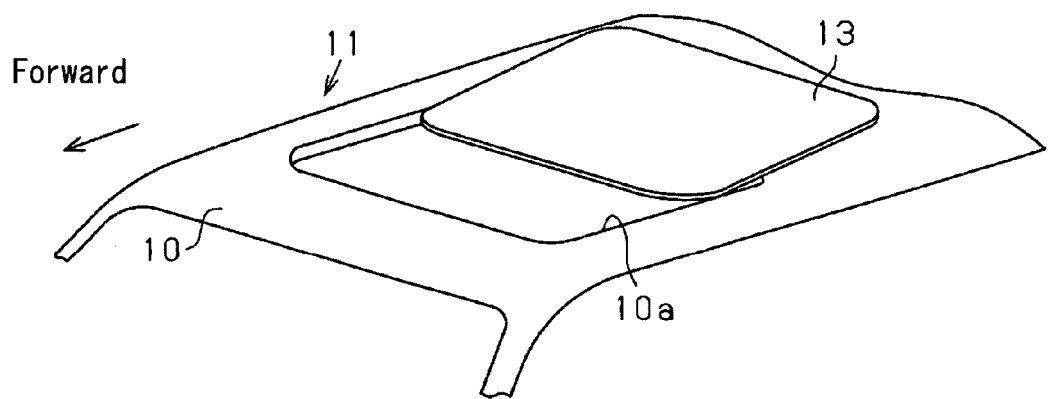
FIG. 7 is a perspective view of a roof viewed from an obliquely upward direction.

One embodiment of a roof apparatus for a vehicle will be explained with reference to illustrations of drawing figures as follows. As shown in FIG. 7, a roof 10 for a vehicle, for example for an automobile, is formed with a roof opening portion 10a formed in an approximately rectangular shape. Further, a sunroof apparatus 11 which supports a movable panel 13 formed in an approximately rectangular shape and made from, for example, a pane, is provided at the roof 10.

The movable panel 13 is attached to the roof 10 so that a rear portion thereof moves upwardly by a pivotal movement about a front portion thereof (i.e., a tilt-up operation) and to be slidable in front-rear directions of the vehicle. An outer sliding type mechanism is applied for an opening-closing operation of the roof opening portion 10a by the movable panel 13, in which the movable panel 13 slides maintaining a tilted state.

A structure of the sunroof apparatus 11 in connection with the opening-closing operation of the movable panel 13 will be explained as follows. The sunroof apparatus 11 is provided with structures for opening and closing the movable panel 13 at the both sides of the roof opening portion 10a in a vehicle width direction as a pair. Basically, the structure provided at one of the sides of the roof opening portion 10a in the vehicle width direction will be explained for an explanatory purpose. Hereinafter, directions, such as "front/rear", "up/down", or the like, correspond to an orientation of the vehicle.

Figure 4:
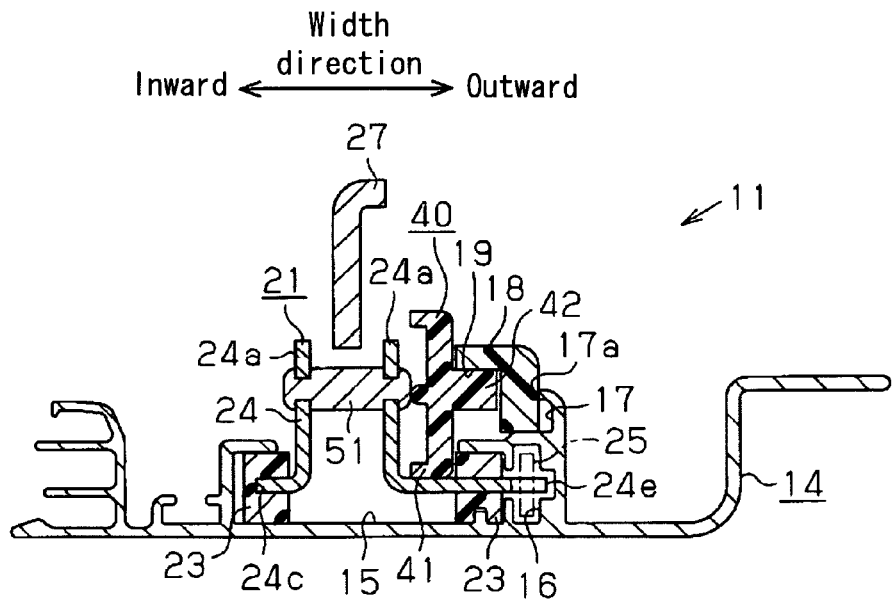
FIG. 4 is a cross-sectional view of the roof apparatus taken on line IV-IV in FIG. 2B according to the embodiment disclosed here.
Figure 5:
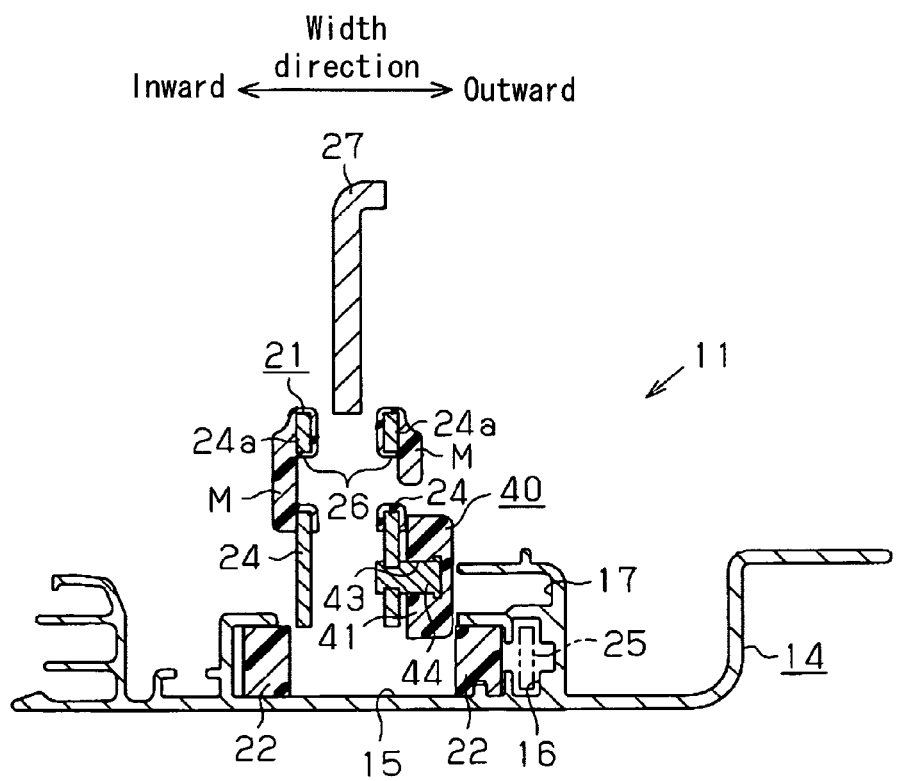
FIG. 5 is a cross-sectional view of the roof apparatus taken on line V-V in FIG. 3B according to the embodiment disclosed here.

As shown in FIGS. 1A-1C, a guide rail 14 having a constant cross-section, which is, for example, made from an extrusion member of aluminum alloy, is provided at an edge portion of the roof opening portion 10a in the vehicle width direction to extend in a front-rear direction of the vehicle. As illustrated in FIGS. 4 and 5, the guide rail 14 is formed with a first rail portion 15 having a cross-section formed approximately in a C-shape which opens in an upward direction of the vehicle, and formed with a second rail portion 16 adjacent to the first rail portion 15 at an outer side thereof in a vehicle width direction. A space defined by the second rail portion 16 and a sidewall of the first rail portion 15 forms an approximately T-shape in cross-section. The second rail portion 16 is in communication with the first rail portion 15 via an opening formed on the sidewall of the first rail portion 15.

Further, the guide rail 14 is provided with a third rail portion 17 at a position which is outward of the first rail portion 15 in the vehicle width direction and upward of the second rail portion 16. The third rail portion 17, an upper wall portion of the first rail portion 15, and an upper wall portion of the second rail portion 16 form an approximately U-shaped cross-section whose opening portions faces inward in the vehicle width direction.

As shown in FIG. 2B, a cut-away portion 17a is formed on an upper wall of the third rail portion 17 at a predetermined position in the front-rear direction of the vehicle. A guide block 18, for example, made from a resin member is fitted to the cut-away portion 17a of the third rail portion 17 thus to be fixed to the guide rail 14. An engaging groove 19, which is in communication with an inside of the third rail portion 17 at a rear portion of the vehicle, is formed on the guide block 18. The engaging groove 19 inclines downwardly in a vehicle rearward direction, and is in communication with the inside of the third rail portion 17 at the downward position.

A driving shoe 21 is provided at the first rail portion 15 of the guide rail 14 to be movable in the front-rear direction of the vehicle. That is, as shown in FIG. 2A, the driving shoe 21 includes shoe portions 22, 23, and main body portions 24 made from a metal plate. The shoe portion 22 and the shoe portion 23 positioned at forward and rearward relative to each other serves as a pair and are configured to slide in the vehicle width direction at one side of the first rail portion 15. A pair of the shoe portions 22, 23 and the main body portion 24 which is connected to the shoe portions 22, 23 serve as a group, and the driving shoe 21 includes two groups of the shoe portions 22, 23 and the main body portion 24, the two groups of the shoe portions 22, 23 and the main body portion 24 are arranged facing in opposite directions so that the main body portions 24 face each other and connected one another. One of the main body portions (the first main body portion) 24 positioned at an inner side of the first rail portion 15 in the vehicle width direction includes a first wall portion 24a formed in a plate shape and provided in an upright manner or a slightly angled/leaning upright manner above a center portion of the first rail portion 15 in the vehicle width direction, and a pair of extending pieces 24b, 24c which are arranged at front and rear portions of the first main body portion 24, respectively, and extended from a bottom end of the first wall portion 24a inwardly in the vehicle width direction. The extending pieces 24b, 24c are inserted into the shoe portions 22, 23, respectively, to fix the first main body portion 24 to the shoe portions 22, 23. The other of the main body portions (the second main body portion) 24 positioned in the vehicle width direction at an outer side of the first rail portion 15 includes the first wall portion 24a formed in a plate shape and provided in an upright manner or a slightly angled/leaning upright manner above a center portion of the first rail portion 15 in the vehicle width direction, and a pair of extending pieces 24d, 24e which are arranged at front and rear portions of the second main body portion 24, respectively, and extended from the bottom end of the first wall portion 24a outwardly in the vehicle width direction. The extending pieces 24d, 24e are inserted into the shoe portions 22, 23, respectively, to fix the second main body portion 24 to the shoe portions 22, 23.

End portions of the extending pieces 24d, 24e arranged penetrating through the shoe portions 22, 23 are positioned within the second rail 16 through the first rail portion 15 and are inserted to fit to a driving belt 25 which slides on the second rail portion 16 in the front-rear direction of the vehicle. The driving belt 25 is connected to a drive source, for example, an electric motor and is driven by the drive source to move in the front-rear direction of the vehicle along the guide rail 14 (the second rail portion 16). Thus, the driving shoe 21 is actuated to move in the front-rear direction of the vehicle along the guide rail 14 (the first rail portion 15).

Each of the first wall portions 24a (the main body portions 24) is formed with a guide groove 26 opening in the vehicle width direction and extending in the front-rear direction of the vehicle. The guide groove 26 includes a first inclined portion 26a which inclines upwardly towards the forward of the vehicle, a linear portion 26b formed continuously from a front end of the first inclined portion 26a to extend approximately in parallel to the guide rail 14, and a second inclined portion 26c which is formed continuously from a front end of the linear portion 26b to incline upwardly towards the forward of the vehicle.

On the other hand, as shown in FIG. 1, a support panel 28 made from, for example, a metal plate is secured to a bottom surface of the movable panel 13 at edge portions, in the vehicle width direction, positioned above the guide rail 14. A support bracket 27 serving as a support member made from a metal plate which extends in the front-rear direction of the vehicle is fastened to the support panel 28. The support bracket 27 extends over an entire length of the movable panel 13 and includes a second wall portion 27a formed in a plate shape which is provided orthogonally under the movable panel 13. A front end of the second wall portion 27a is rotatably connected to a driven shoe 31 by means of a connection pin 29 axially extended in the vehicle width direction. The driven shoe 31 is provided forward of the driving shoe 21 to be movable in the front-rear direction relative to the first rail portion 15 of the guide rail 14. That is, as shown in FIG. 2A, the driven shoe 31 includes a pair of shoe portions 32 arranged at the end portions of the first rail portion 15 in the vehicle width direction, respectively, to slide thereon and a connecting portion 33 connecting front ends of the shoe portions 32. Each of the shoe portions 32 pivotally supports an end portion of the connection pin 29 arranged penetrating through the support bracket 27 (second wall portion 27a). A rear portion of the movable panel 13 supported by the support bracket 27 moves upwardly and downwardly by rotating about the front end of the support bracket 27 (the connection pin 29) serving as a pivot.

A first guide pin 34 (i.e., serving as a movable member), which is formed approximately in cylindrical shape and made from a metal member, is secured to a front end portion of the support bracket 27 (second wall portion 27a). The first guide pin 34 protrudes in the vehicle width direction to be movably fitted into the guide grooves 26. In other words, the both ends of the first guide pin 34 are supported by the guide grooves 26 of the driving shoes 21, and the second wall portion 27a is positioned between the first wall portions 24a. According to the foregoing construction, the support bracket 27 is avoided from interfering with the driving shoes 21 (first wall portions 24a) by positioning and moving the second wall portion 27a between the first wall portions 24a during the rotation of the support bracket 27. Thus, the support bracket 27 (the second wall portion 27a) is arranged to overlap with a height range of the driving shoe 21 particularly at the fully closed state of the movable panel 13, and thus the roof apparatus for the vehicle is downsized in a vehicle height direction.

As shown in FIG. 1A, the first guide pin 34 is arranged to be positioned at a bottom end of the guide groove 26 (the first inclined portion 26a) when the movable panel 13 is fully closed. Thus, when the driving shoe 21 moves in the front-rear direction of the vehicle along the guide rail 14 (the first rail portion 15) in this state, the first guide pin 34 guided by the guide groove 26 moves on the first inclined portion 26a upward to reach the linear portion 26b. In those circumstances, by pivoting the movable panel 13 about the front end of the support bracket 27 serving as the pivot in response to an upward movement of the support bracket 27 (first guide pin 34) relative to the driving shoe 21, as shown in FIG. 1B, the rear portion of the movable panel 13 moves upwardly to tilt (i.e., first tilted-up state).

Thereafter, when the driving shoe 21 further moves along the guide rail 14 (the first rail portion 15) in the rearward direction of the vehicle, the first guide pin 34 guided by the guide groove 26 moves on the second inclined portion 26c upwardly to reach an end thereof. In those circumstances, in response to the movement of the support bracket 27 (the first guide pin 34) in an upward direction relative to the driving shoe 21, the movable panel 13 further rotates (pivots) about the front end of the support bracket 27 serving as the pivot to further moves the rear portion of the movable panel 13 upwardly to tilt-up (i.e., a second tilted-up state). Then, when the driving shoe 21 further moves in the rearward direction of the vehicle along the guide rail 14 (the first rail portion 15), the movable panel 13 in the second tilted-up state slides in the rearward direction of the vehicle integrally with the driving shoe 21. Accordingly, the movable panel 13 is assumed to be in a fully open state as illustrated in FIG. 1C.

When the driving shoe 21 moves in a forward direction of the vehicle from the fully open state of the movable panel 13, the components of the roof apparatus are operated in a reversal direction from the above-explained operation. As illustrated in FIGS. 2A and 2B, a check member 40, for example, made from a resin member is rotatably connected to the driven shoe 31 by means of the connection pin 29. That is, the check member 40 includes a main body wall portion 41 which is formed to be in an upright manner and extends in the front-rear direction of the vehicle between the shoe portions 22, 23 and one of the first wall portions 24a of the driving shoe 21 positioned at an outer side in the vehicle width direction. By an insertion of the connection pin 29 into a bearing hole (slot) 41a shaped in a long hole formed on a front end portion of the main body wall portion 41, the check member 40 is rotatably connected to the driven shoe 31. Further, the check member 40 includes an engaging projection 42 projecting outwardly in the vehicle width direction from a rear end portion of the main body wall portion 41.

A movement of the check member 40 together with the driven shoe 31 in the rearward direction (front-rear directions) of the vehicle along the guide rail 14 is stopped by fitting the engaging projection 42 into the engaging groove 19 in a state where an upper surface of the engaging projection 42 is in contact with an inner wall surface of the engaging groove 19. Further, the stopping of the movement of the check member 40 in the rearward direction (front-rear directions) of the vehicle along the guide rail 14 is canceled by a clockwise rotation of the check member 40 in FIG. 2B about the front end thereof (the connection pin 29) as the pivot so that the engaging projection 42 is disengaged from the engaging groove 19 to enter the third rail portion 17.

The check member 40 includes a cam hole (a cam slot) 43 opening in the vehicle width directions. The cam slot 43 includes a linear portion 43a formed in a long hole shape extending in the front-rear direction of the vehicle and an inclined portion 43b continuously formed from a rear end of the linear portion 43a and inclining upwardly towards the rear of the vehicle. On the other hand, one of the first wall portions 24a of the driving shoe 21 provided at the outer side in the vehicle width direction is provided with a second guide pin 44 which projects outwardly in the vehicle width direction to be inserted into the cam slot 43. That is, an attitude of the check member 40 is determined by restricting the position in the upward and downward direction by the connection pin 29 and the second guide pin 44.

When the second guide pin 44 slides on the linear portion 43a of the cam slot 43 in response to the movement of the driving shoe 21 in the front-rear direction of the vehicle, the check member 40 maintains a constant attitude without pivoting about the connection pin 29. In those circumstances, the engaging projection 42 is set to fit into the engaging groove 19. The rotation of the check member 40 about the connection pin 29 or a deformation of the check member 40 in a direction to disengage the engaging projection 42 from the engaging groove 19 is restricted by contacting or closely positioning a bottom surface of the rear end portion of the main body wall portion 41 to the extending piece 24e of the driving shoe 21. A moving range of the second guide pin 44 along the linear portion 43a corresponds to a moving range of the driving shoe 21 when the movable panel 13 is moved from, for example, the fully closed state to be slidable in the second tilted-up state via the tilt-up operation.

As shown in FIGS. 3A and 3B, when the second guide pin 44 reaches the rear end of the linear portion 43a of the cam slot 43 and enters the inclined portion 43b in response to the movement of the driving shoe 21 in the rearward direction of the vehicle, the check member 40 pushed by the second guide pin 44 at the inclined portion 43b rotates about the connection pin 29 in the clockwise direction in FIGS. 3A and 3B. In those circumstances, because the rear end portion of the main body wall portion 41 is positioned between the extending pieces 24d, 24e during the movement of the driving shoe 21 in the rearward direction of the vehicle, the rotation of the check member 40 is not restricted. Thus, the engaging projection 42 is guided by the engaging groove 16 to enter the third rail portion 17. Then, the check member 40 maintains a constant attitude without rotating about the connection pin 29 by the fitting engagement of the engaging projection 42 with the third rail portion 17. Accordingly, upon the further movement of the driving shoe 21 in the rearward direction of the vehicle in the foregoing state, the check member 40 which is engaged with the second guide pin 44 at the inclined portion 43b moves in the rearward direction of the vehicle together with the driven shoe 31 while sliding the engaging projection 42 in the third rail portion 17. Then, the movable panel 13 slides while maintaining the second tilted-up state to establish the fully open state.

A third guide pin 45 projecting outward in the vehicle width direction at a rear of the connection pin 29 is provided at a front end portion of the support bracket 27. A guiding slot 46, which is formed approximately in an L-shape to accord to a relative moving locus of the third guide pin 45 when moving the movable panel 13 (from the fully closed state to the tilt-up operation, and then to the sliding operation) and to which the third guide pin 45 is inserted, is formed on the check member 40. In other words, positioning of the check member 40 relative to the support bracket 27 during the operation of the movable panel 13 is determined by the engagement of the third guide pin 45 and the guiding slot 46.

Figure 6A:
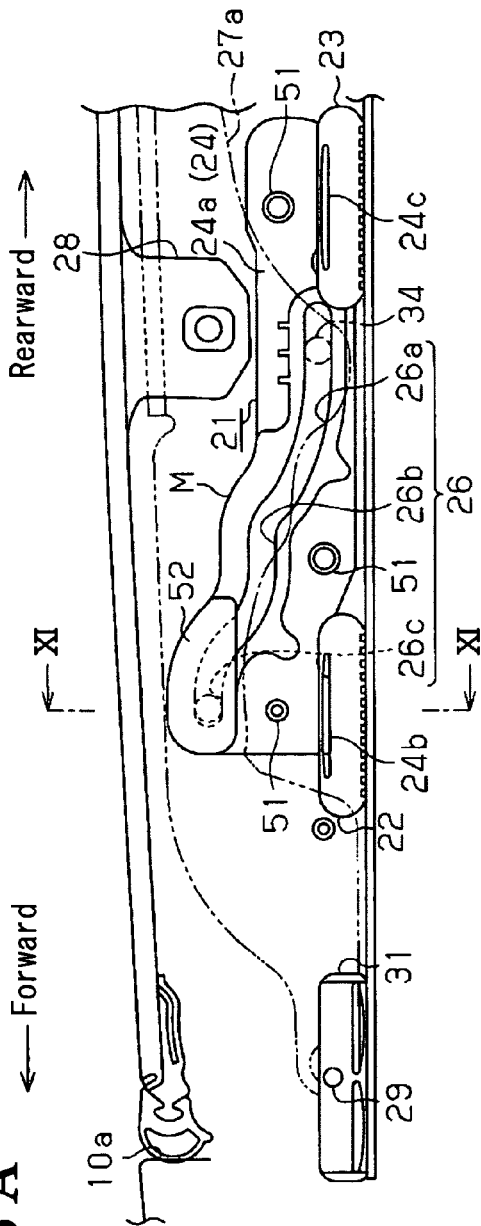
FIG. 6A is a lateral view of the movable panel during the fully closed state.
Figure 6C:
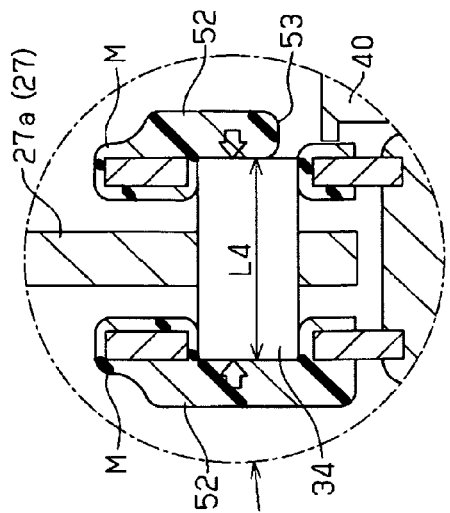
FIG. 6C is an enlarged partial sectional view of the movable panel of FIG. 6B.
Figure 6B:
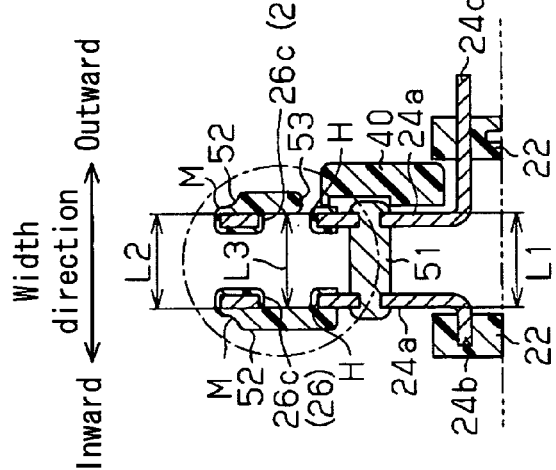
FIG. 6B is a cross-sectional view taken on line XI-XI in FIG. 6A.

Constructions of the driving shoe 21 according to the embodiment will be further explained as follows. As shown in FIGS. 6A and 6B, the main body portions 24 of the driving shoe 21 are connected by plural fastening pins 51 (e.g., three fastening pins) each extending in the vehicle width direction at the first wall portions 24a. The plural pins 51 are arranged in parallel to one another in the front-rear direction of the vehicle. Positions, lengths, tightening forces, and other conditions of the pins 51 are determined so that a length of a clearance between the first wall portions 24a in the vehicle width direction is gradually reduced towards the upper portion thereof (i.e., gradually reduced as being closer to an end facing the support bracket 27). Namely, when a length of the clearance between the first wall portions 24a at a base end in the vehicle width direction is defined as L1 and a length of the clearance between the first wall portions 24a at a tip end in the vehicle width direction is defined as L2, the relationship that L1 is greater than L2 (L1>L2) is satisfied.

An inner wall surface of a long slot H formed on the first wall portion 24a to accord to an outer profile of each portion of the guide groove 26 (the first inclined portion 26a, the linear portion 26b, and the second inclined portion 26c) is covered with a resin-made member M which is, for example, formed by an outsert molding. The resin-made member M is provided for preventing generations of noises by a contact between metals when the first guide pin 34 slides on the guide groove 26. The resin-made member M is, for example, made of Nylon 66 (PA 66).

The resin-made member M is formed with a restriction portion 52 closing one side of the second inclined portion 26c of the guide groove 26 (i.e., the side of the second inclined portion 26c at one of the first wall portions 24a which is away from the other of the first wall portions 24a in the vehicle width direction). A length L3 of a distance between opposing surfaces of the restriction portions 52 in the vehicle width direction in a state where the first guide pin 34 is not arranged and fitted thereto is determined to be approximately the same to the length L2 between the first wall portions 24a at the tip ends and to be slightly shorter than a length L4 of the first guide pin 34 in the vehicle width direction.

Accordingly, as shown in FIG. 6B, when the first guide pin 34 is arranged and fitted to the restriction portion 52, that is, when the movable panel 13 establishes the second tilted-up state to be slidable, the main body portions 24 are elastically deformed so that the clearance between the first wall portions 24a is expanded by a difference between the length L3 and the length L4, the restriction portions 52 come to contact respective end surfaces of the first guide pin 34 in the vehicle width direction with pressure. Thus, the support bracket 27 fixed to the movable panel 13 is restricted in the vehicle width direction in the tilted-up state of the movable panel 13 supported by the guide rail 14 particularly at the front end portion, which is particular construction for the outer sliding type roof apparatus. At the closed state of the movable panel 13, it is not very necessary to take the restriction of the movement of the movable panel 13 in the vehicle width direction into the consideration because an entire edge portion of the roof opening portion 10a tightly contacts a sealing member of the movable panel 13. At the first tilted-up state of the movable panel 13, because a front end edge portion of the roof opening portion 10a tightly contacts the sealing member of the movable panel 13, it may not be necessary to take the restriction of the movement of the movable panel 13 in the vehicle width direction into the consideration although it may be favorable to take that into consideration. A length of the roof opening portion 10a of the vehicle in the vehicle width direction is formed to be longer towards the rearward of the vehicle. According to this structure, when the movable panel 13 slides in the rearward direction in the second tilted-up state, shakiness in the vehicle width direction may be generated when the sealing member of the movable panel 13 separates from the front-end edge portion of the roof opening portion 10a. Thus, at the second tilted-up state of the movable panel 13, it is necessary to provide a countermeasure for restricting the movement of the movable panel 13 in the vehicle width direction.

The restriction portion 52 provided at a side closer to the check member 40 in the vehicle width direction (right side in FIG. 6B) is formed with a run-off portion 53 which is formed by cutting-out a bottom end of the restriction portion 52. The run-off portion 53 is provided to ensure a space for avoiding an interference between the restriction portion 52 and the check member 40.

An operation of the roof apparatus according to the embodiment will be explained as follows. A fitting engagement of the engaging projection 42 to the engaging groove 19 is maintained by the cam slot 43 (linear portion 43a) to which the second guide pin 44 is inserted from the closed state of the movable panel 13 until the movable panel 13 starts sliding via the tilted-up operation (the second tilted-up state). In those circumstances, the movement of the check member 40 in the rearward direction of the vehicle together with the driven shoe 31 is restrained.

On the other hand, when the movable panel 13 starts sliding successively from the foregoing operation, the guide pin 44 is inserted into the cam slot 43 (inclined portion 43b) to guide the check member 40 to rotate in a direction to disengage the engaging projection 42 from the engaging groove 19. Thus, the blocking, or stopping of the movement of the check member 40 together with the driven shoe 31 in the rearward direction of the vehicle is canceled so that the movable panel 13 becomes slidable. As explained above, when the engaging projection 42 disengaged from the engaging groove 19 fits into the third rail portion 17, the rotation of the check member 40 is restricted again by the third rail portion 17. Thus, when the driving shoe 21 further moves in the rearward direction of the vehicle, the driven shoe 31 moves in the rearward direction of the vehicle via the check member 40 which is engaged with the second guide pin 44 at the inclined portion 43b of the cam slot 43, and the support bracket 27 engaged with the second inclined portion 26c of the guide groove 26 moves in the rearward direction of the vehicle. Then, the movable panel 13 slides to be in the fully open state while maintaining the tilted-up state (second tilted-up state). In those circumstances, by the contact of the restriction portions 52 to the end surfaces of the first guide pin 34 in the vehicle width direction with pressure, the movement of the movable panel 13 (and the support bracket 27) is restricted in the vehicle width direction.

When the movable panel 13 is operated from the fully open state in the closing direction, the fitting engagement of the engaging projection 42 relative to the third rail portion 17 is maintained until the movable panel 13 completes the sliding operation. Accordingly, when the driving shoe 21 moves in the forward direction of the vehicle, the driven shoe 31 moves in the forward direction of the vehicle via the check member 40 which is engaged with the second guide pin 44 at the inclined portion 43b of the cam slot 43, and thus the movable panel 13 slides while maintaining the tilted-up state (second tilted-up state). In those circumstances, by the contact of the restriction portions 52 to the end surfaces of the first guide pin 34 in the vehicle width direction with pressure, the movement of the movable panel 13 (and the support bracket 27) is restricted in the vehicle width direction. Then, when the sliding operation of the movable panel 13 is completed, the check member 40 is pivotally guided so that the engaging projection 42 fits into the engaging groove 19 by the cam slot 43 (the inclined portion 43b) to which the second guide pin 44 is inserted. Accordingly, the movement of the check member 40 in the forward direction of the vehicle is restrained together with the driven shoe 31 so that the movable panel 13 is assumed to be operable for the tilting-down. Thus, when the driving shoe 21 further moves in the forward direction of the vehicle, the movable panel 13 is tilted-down to be in the fully closed state by guiding the first guide pin 34 by the guide groove 26 while sliding the second guide pin 44 on the linear portion 43a of the cam slot 43.

According to the constructions of the embodiment explained above, the following effects and advantages are attained.

First, according to the constructions of the embodiment, because pair of the restriction portions 52 provided at the first wall portions 24a (guide grooves 26) are in contact with the end surfaces of the first guide pin 34 in the vehicle width direction with pressure when the tilted-up state (second tilted-up state) of the movable panel 13 is established, the second wall portion 27a is restricted in the vehicle width direction relative to the first wall portions 24a. Thus, the support bracket 27 (and the movable panel 13) is restricted in the vehicle width direction relative to the driving shoe 21. Further, because the restriction portions 52 are integrally formed with the first wall portions 24a (driving shoe 21), respectively, the number of the parts is reduced.

Second, according to the construction of the embodiment, each of the restriction portions 52 are formed with the resin-made member M which is integrally formed on each of the guide grooves 26. Thus, even if the first guide pin 34 is made of metal, the contact between the metals is avoided to restrain the generation of the noises, for example, when the first guide pin 34 slides on the guide groove 26 or when the position of the first guide pin 34 is displaced in the vehicle width direction.

Third, according to the construction of the embodiment, the restriction portions 52 are arranged to contact the end surfaces of the first guide pin 34 in the vehicle width direction, respectively, with pressure limiting to the second tilted-up state of the movable panel 13. Thus, the check member 40 is positioned using the space formed at the outer side in the vehicle width direction of one of the first wall portions 24a provided at the outer side in the vehicle width direction (i.e., the side away from the other of the first wall portions 24a provided at the inner side in the vehicle width direction), and at the base end of the first wall portion 24a relative to the restriction portion 52 provided at the first wall portion 24a.

Fourth, according to the construction of the embodiment, because the run-off portion 53 is provided at one of the restriction portions 52 positioned at the side where the check member 40 is arranged, the interference between the restriction portion 52 and the check member 40 is further securely avoided.

Fifth, according to the construction of the embodiment, because the restriction portions 52 are made of resin (e.g., Nylon 66, or PA66), the changes in hardness depending on the temperature and an adherence with surrounding members due to secular change, which is caused in the case where, for example, the rubber is applied, is restrained, and thus the variations in performance is restrained.

Sixth, according to the construction of the embodiment, when the movable panel 13 is, for example, at the closed state, the support bracket 27 (and the movable panel 13) is not restricted in the vehicle width direction relative to the driving shoe 21. In other words, play is given at the support bracket (and the movable panel 13). Thus, by assembling the movable panel 13 onto the sunroof apparatus 11 in a state corresponding to the closed state of the movable panel 13 and by using the play as an adjusting allowance for the fitting in the vehicle width direction, the movable panel 13 is smoothly assembled even if the roof 10 includes the variations.

The roof apparatus according to the embodiment may be modified as follows.

Figure 8:
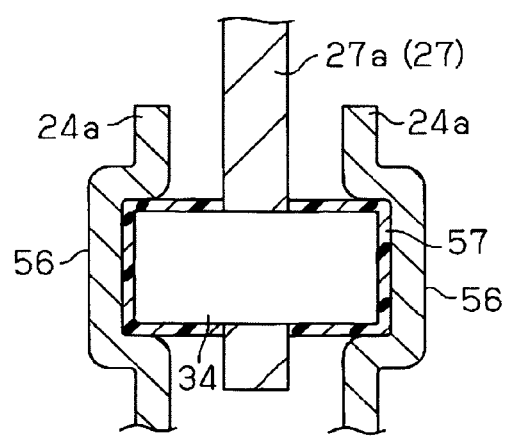
FIG. 8 is a lateral cross-sectional view of a modified example of the embodiment disclosed here.

As illustrated in FIG. 8, a restriction portion 56 formed integrally with the first wall portion 24a (guide groove) may be applied. Particularly, the restriction portion 56 is formed by, for example, an insert molding so that a distance between the first wall portions 24a is increased in the vehicle width direction according to a configuration of an end portion of the guide groove (the second inclined portion). In those circumstances, in order to avoid the contact between the metals, an outer wall surface of the first guide pin 34 may be covered with a covering member 57 made of resin. Thus, the contact between the metals can be avoided, and, for example, the generation of the noises, for example, when the first guide pin 34 slides on the guide groove 26, or when the position of the first guide pin 34 is displaced in the vehicle width direction, is restrained.

According to the embodiment, in order to contact the end surfaces of the first guide pin 34 in the vehicle width direction with the pair of the restriction portions 52 (56) with pressure, it is sufficient to establish the relationship that the length L3 between opposing surfaces of the restriction portions 52 (56) in the vehicle width direction is shorter than the length L4 of the first guide pin 34 in the vehicle width direction. Thus, for example, even if the clearance between the first wall portions 24a in the vehicle width direction is not gradually reduced towards the upper portion thereof and the first wall portions 24a are arranged in parallel to each other, as long as configuring to contact the first guide pin 34 with the restriction portions 52 with pressure, for example, by deflecting, in the outward direction, a portion of each of the first wall portions 24a at which the restriction portion 52 (56) is provided. That is, the following structures are applicable: 1. The length L1 of the clearance between the first wall portions 24a at the base end in the vehicle width direction is equal to the length L2 of the clearance between the first wall portions 24a at the tip end in the vehicle width direction and is equal to the length L3, and the length L3 is shorter than the length L4 (i.e., L1=L3=L2 and L3<L4); and 2. The length L1 is shorter than the length L3, the length L3 is shorter than the length L2, and the length L3 is shorter than the length L4 (i.e., L1<L3<L2, and L3<L4).

According to the embodiment, as long as the restriction portions 52 (56) are provided at the first wall portions 24a, the restriction portions 52 (56) are not necessarily provided on the guide groove 26. According to the embodiment, the restriction portion 52 (resin-made member M) may be made of other types of resin, for example, Acrylonitrile Butadiene Styrene (ABS) resin.

According to the embodiment, the restriction portion may restrict the movable panel 13 (and the support bracket 27) in the vehicle width direction at an initial stage of a tilt-up operation of the movable panel 13 from the closed state (i.e., the first tilt-up state) in addition to the second tilt-up state.

According to the embodiment, the guide groove 26 (the first wall portion) is formed on the drive shoe 21 and the first guide pin 34 (the second wall portion) is provided at the support bracket 27, however, the positioning of the members may be modified, for example, the first guide pin 34 (the second wall portion) may be provided at the drive shoe 21 and the guide groove 26 (the first wall portion) may be formed on the support bracket 27.

According to the embodiment, as long as properly functioning, the check member 40 may be arranged at an inner side in the vehicle width direction of one of the first wall portions 24a provided at the inner side in the vehicle width direction (i.e., the side being away from the other of the wall portions 24a provided at the outer side in the vehicle width direction) and at the base end side of the first wall portion 24a relative to the restriction portion 52 provided at the first wall portion 24a.

According to the embodiments, the roof apparatus for the vehicle includes the driven shoe 31 which is provided at the forward relative to the driving shoe 21 to be movable along the guide rail 14 in the front-rear direction of the vehicle and to which the front end portion of the support member 27 is connected, and the check member 40 restricts the sliding movement of the movable panel 13 by stopping the movement of the driven shoe 31 in the front-rear direction.

According to the embodiments, the first guide pin 34 of the roof apparatus for the vehicle is covered with the resin-made member. According to this construction, even if the restriction portion is made of metal, the contact between the metals can be avoided because the first guide pin 34 is covered with the resin-made member, and the generation of the noise, for example, in accordance with the sliding movement of the first guide pin 34 on the guide groove 26, or the positional displacement of the first guide pin 34 in the vehicle width direction is restrained.

According to the embodiment, the roof apparatus 11 for the vehicle, which includes the driving shoe 21 provided along the guide rail 14 which is provided at an edge portion of the opening portion 10a formed on the roof 10 of the vehicle in a vehicle width direction, the driving shoe 21 being movable in a front-rear direction of the vehicle, the support member 27 fixed at an edge portion in the vehicle width direction of the movable panel 13 opening and closing the opening portion 10a of the roof 10, a pair of the first wall portions 24a provided at one of the driving shoe 21 and the support member 27, each of the first wall portions 24a being formed with the guide groove 26 and the first wall portions 24a being arranged in parallel to each other in the vehicle width direction, the second wall portion 27a provided at the other of the driving shoe 21 and the support member 27, and being arranged between the first wall portions 24a, the second wall portion 27a including a movable member 34, the movable panel 13 being tilted-up from a closed state by pushing one of the guide grooves 26 provided at the driving shoe 21 and the movable member 34 by the other one of the guide grooves 26 and the movable member 34 to move the support member 27 upwardly relative to the driving shoe 21 in response to the movement of the driving shoe 21 in the front-rear direction of the vehicle, and a pair of the restriction portions 52(56) provided at the first wall portions 24a and contacting end surfaces of the movable member 34 in the vehicle width direction during the tilted-up state of the movable panel 13 with pressure.

According to the embodiment, the length between the end surfaces of the movable member 34 is defined to be longer than the distance between the restriction portions 52(56), and the restriction portions 52(56) are configured to be elastically deformable by a difference between the length between the end surfaces of the movable member 34 and the distance between the restriction portions 52(56).

According to the embodiment, pair of the restriction portions 52 (56) provided at the first wall portions 24a contact the end surfaces of the first guide pin 34 in the vehicle width direction with pressure when the movable panel 13 establishes the tilted-up state, thus to restrict the movement of the second wall portion 27a in the vehicle width direction relative to the first wall portions 24a. Accordingly, the support bracket 27 (support member) (and the movable panel 13) is restricted in the vehicle width direction relative to the driving shoe 21. Further, because the restriction portions 52 (56) are integrally formed relative to the first wall portions 24a (driving shoe 21 or support bracket 27 (support member)), the number of parts may be reduced.

According to the embodiment, the restriction portions 52 (56) are made from a resin-made member M integrally formed on the guide grooves.

According to the embodiment, even if the first guide pin 34 is made of metal, the contact between the metals is avoided by forming the restriction portions with the resin-made member, and for example, the generation of the noise in accordance with the sliding movement of the first guide pin 34 on the guide groove 26, or the positional displacement of the first guide pin 34 in the vehicle width direction is restrained.

According to the embodiment, the roof apparatus includes the movable panel 13 being moved to tilt-up from the closed state to establish the first tilted-up state by moving the support member 27 upwardly relative to the driving shoe 21 in response to the movement of the driving shoe 21 in the front-rear direction of the vehicle, the movable panel 13 being further tilted upwardly from the first tilted-up state by moving the support member 27 upwardly relative to the driving shoe 21 in response to the further movement of the driving shoe 21 in the front-rear direction of the vehicle to establish the second tilted-up state where the movable panel 13 is assumed to be slidable, the restriction portions 52 (56) being arranged to contact the end surfaces of the movable member 34 in the vehicle width direction when the second tilted-up state is established, and the check member 40 positioned at a side of one of the first wall portions 24a being away from the other of the first wall portions 24a and at a base end side of the first wall portion 24a relative to the restriction portion 52 (56) provided at the first wall portion 24a, the check member 40 restricting the sliding movement of the movable panel 13 during a time from the closed state until establishing the second tilted-up state.

According to the embodiment, the restriction portions 52 (56) are arranged to contact the end surfaces of the first guide pin 34 in the vehicle width direction with pressure only at the second tilted-up state. The check member 40 may be positioned using the space provided at the side of one of the first wall portions in the vehicle width direction which is away from the other of the first wall portions 24a and at the base end side of the first wall portion relative to the restriction portion 52 (56) provided at the first wall portion 24a.

According to the embodiment, one of the restriction portions 52 (56) provided at the side where the check member 40 is positioned includes a run-off portion 53 for avoiding an interference with the check member 40.

According to the embodiment, because the run-off portion 53 is formed at one of the restriction portions 52 (56) provided at a side where the check member 40 is provided, an interference between the restriction portion 52 (56) and the check member 40 is further securely avoided.

According to the embodiment, the roof apparatus for the vehicle which enables to restrict the movable panel 13 in the tilted-up state in the vehicle width direction while restraining an increase in the number of the parts is provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus for a vehicle, comprising:
   a driving shoe provided along a guide rail which is provided at an edge portion of an opening portion formed on a roof of the vehicle in a vehicle width direction, the driving shoe being movable in a front-rear direction of the vehicle;
   a support member fixed at an edge portion in the vehicle width direction of a movable panel opening and closing the opening portion of the roof;
   a pair of first wall portions provided at one of the driving shoe and the support member, each of the first wall portions being formed with a guide groove and the first wall portions being arranged in parallel to each other in the vehicle width direction;
   a second wall portion provided at the other of the driving shoe and the support member, and being arranged between the first wall portions, the second wall portion including a movable member;
   the movable panel being tilted-up from a closed state by pushing one of the guide grooves provided at the driving shoe and the movable member by the other one of the guide grooves and the movable member to move the support member upwardly relative to the driving shoe in response to a movement of the driving shoe in the front-rear direction of the vehicle; and
   a pair of restriction portions provided at the first wall portions and contacting end surfaces of the movable member in the vehicle width direction during the tilted-up state of the movable panel with pressure;
   wherein a length between the end surfaces of the movable member is defined to be longer than a distance between the restriction portions in a state where the movable member is not arranged and fitted thereto; and
   the restriction portions are configured to be elastically deformed so that a clearance between the restriction portions is expanded by a difference between the length between the end surfaces of the movable member and the distance between the restriction portions in the state where the movable member is not arranged and fitted thereto.

2. The roof apparatus according to claim 1, wherein the restriction portions are made from a resin-made member integrally formed on the guide grooves.

3. The roof apparatus according to claim 1, comprising:
   the movable panel being moved to tilt-up from the closed state to establish a first tilted-up state by moving the support member upwardly relative to the driving shoe in response to the movement of the driving shoe in the front-rear direction of the vehicle;
   the movable panel being further tilted upwardly from the first tilted-up state by moving the support member upwardly relative to the driving shoe in response to the further movement of the driving shoe in the front-rear direction of the vehicle to establish a second tilted-up state where the movable panel is assumed to be slidable;
   the restriction portions being arranged to contact the end surfaces of the movable member in the vehicle width direction when the second tilted-up state is established; and
   a check member positioned at a side of one of the first wall portions being away from the other of the first wall portions and at a base end side of the first wall portion relative to the restriction portion provided at the first wall portion, the check member restricting the sliding movement of the movable panel during a time from the closed state until establishing the second tilted-up state.

4. The roof apparatus according to claim 2, comprising:
   the movable panel being moved to tilt-up from the closed state to establish a first tilted-up state by moving the support member upwardly relative to the driving shoe in response to the movement of the driving shoe in the front-rear direction of the vehicle;
   the movable panel being further tilted upwardly from the first tilted-up state by moving the support member upwardly relative to the driving shoe in response to the further movement of the driving shoe in the front-rear direction of the vehicle to establish a second tilted-up state where the movable panel is assumed to be slidable;
   the restriction portions being arranged to contact the end surfaces of the movable member in the vehicle width direction when the second tilted-up state is established; and
   a check member positioned at a side of one of the first wall portions being away from the other of the first wall portions and at a base end side of the first wall portion relative to the restriction portion provided at the first wall portion, the check member restricting the sliding movement of the movable panel during a time from the closed state until establishing the second tilted-up state.

5. The roof apparatus for the vehicle according to claim 3, wherein one of the restriction portions provided at a side where the check member is positioned includes a run-off portion for avoiding an interference with the check member.

6. The roof apparatus for the vehicle according to claim 4, wherein one of the restriction portions provided at a side where the check member is positioned includes a run-off portion for avoiding an interference with the check member.

7. A roof apparatus for a vehicle, comprising:
   a driving shoe provided along a guide rail which is provided at an edge portion of an opening portion formed on a roof of the vehicle in a vehicle width direction, the driving shoe being movable in a front-rear direction of the vehicle;
   a support member fixed at an edge portion in the vehicle width direction of a movable panel opening and closing the opening portion of the roof;
   a pair of first wall portions provided at one of the driving shoe and the support member, each of the first wall portions being formed with a guide groove and the first wall portions being arranged in parallel to each other in the vehicle width direction;

a second wall portion provided at the other of the driving shoe and the support member, and being arranged between the first wall portions, the second wall portion including a movable member;

the movable panel being tilted-up from a closed state by pushing one of the guide grooves provided at the driving shoe and the movable member by the other one of the guide grooves and the movable member to move the support member upwardly relative to the driving shoe in response to a movement of the driving shoe in the front-rear direction of the vehicle;

a pair of restriction portions provided at the first wall portions and contacting end surfaces of the movable member in the vehicle width direction during the tilted-up state of the movable panel with pressure;

the movable panel being moved to tilt-up from the closed state to establish a first tilted-up state by moving the support member upwardly relative to the driving shoe in response to the movement of the driving shoe in the front-rear direction of the vehicle;

the movable panel being further tilted upwardly from the first tilted-up state by moving the support member upwardly relative to the driving shoe in response to the further movement of the driving shoe in the front-rear direction of the vehicle to establish a second tilted-up state where the movable panel is assumed to be slidable;

the restriction portions being arranged to contact the end surfaces of the movable member in the vehicle width direction when the second tilted-up state is established; and a check member positioned at a side of one of the first wall portions being away from the other of the first wall portions and at a base end side of the first wall portion relative to the restriction portion provided at the first wall portion, the check member restricting the sliding movement of the movable panel during a time from the closed state until establishing the second tilted-up state.

8. The roof apparatus for the vehicle according to claim 7, wherein one of the restriction portions provided at a side where the check member is positioned includes a run-off portion for avoiding an interference with the check member.

9. The roof apparatus for the vehicle according to claim 1, wherein the first wall portions are arranged so that a length of a clearance in the vehicle width direction between the first wall portions at a base end is assumed to be greater than a length of a clearance in the vehicle width direction between the first wall portions at a tip end corresponding to an upper side in an upward-downward direction of the first wall portion.

* * * * *